United States Patent
Huang et al.

(10) Patent No.: US 12,405,763 B2
(45) Date of Patent: Sep. 2, 2025

(54) IMAGE PROCESSOR CIRCUIT SUPPORTING TWO-PIXEL MODE AND PICTURE-IN-PICTURE MODE AND IMAGE PROCESSING METHOD THEREOF

(71) Applicant: Realtek Semiconductor Corporation, Hsinchu (TW)

(72) Inventors: Hui Huang, Jiangsu Province (CN); Chia-Wei Yu, Hsinchu (TW); Tien-Hung Lin, Hsinchu (TW); Jiamei Feng, Jiangsu Province (CN)

(73) Assignee: Realtek Semiconductor Corporation, Hsinchu (TW)

( * ) Notice: Subject to any disclaimer, the term of this patent is extended or adjusted under 35 U.S.C. 154(b) by 188 days.

(21) Appl. No.: 18/512,045

(22) Filed: Nov. 17, 2023

(65) Prior Publication Data

US 2024/0370221 A1 Nov. 7, 2024

(30) Foreign Application Priority Data

May 5, 2023 (CN) .......................... 202310495075.0

(51) Int. Cl.
*G06F 3/147* (2006.01)
*G06T 1/60* (2006.01)
*G09G 5/00* (2006.01)

(52) U.S. Cl.
CPC .............. *G06F 3/147* (2013.01); *G06T 1/60* (2013.01); *G09G 5/006* (2013.01); *G09G 2340/12* (2013.01)

(58) Field of Classification Search
CPC ....................................................... G06F 3/147
See application file for complete search history.

(56) References Cited

U.S. PATENT DOCUMENTS

| 2010/0171735 | A1* | 7/2010 | Tung .................... G09G 3/3685 345/213 |
| 2019/0272803 | A1* | 9/2019 | Sharma .................... G06T 3/053 |
| 2020/0090602 | A1* | 3/2020 | Li ............................. G09G 3/20 |

FOREIGN PATENT DOCUMENTS

CN 109417587 A 3/2019

* cited by examiner

*Primary Examiner* — Shivang I Patel
(74) *Attorney, Agent, or Firm* — CKC & Partners Co., LLC

(57) ABSTRACT

An image processor circuit includes a first processor circuit and a second processor circuit. In a two-pixel mode, the first processor circuit is configured to process a first part of first input data and the second processor circuit is configured to process a second part of the first input data to generate output data for a display panel to display. In a picture-in-picture mode, the first processor circuit is configured to process second input data to generate main-picture output data and the second processor circuit is configured to process third input data to generate sub-picture output data for the display panel to display.

20 Claims, 6 Drawing Sheets

IMAGE PROCESSOR CIRCUIT SUPPORTING TWO-PIXEL MODE AND PICTURE-IN-PICTURE MODE AND IMAGE PROCESSING METHOD THEREOF

RELATED APPLICATIONS

This application claims priority to Chinese Application Serial Number 202310495075.0, filed May 5, 2023, which is herein incorporated by reference.

BACKGROUND

Technical Field

The present disclosure relates to image processing technology. More particularly, the present disclosure relates to an image processor circuit and an image processing method.

Description of Related Art

With developments of technology, various image processing methods are developed. In some applications, if a display system supports a two-pixel mode, it needs to dispose two set of image processor circuits in a display system to process two pixels at the same time. This will increase the circuit area, and one of the two set of image processor circuits will be idle when the display system does not need to support the two-pixel mode.

SUMMARY

Some aspects of the present disclosure are to provide an image processor circuit. The image processor circuit includes a first processor circuit and a second processor circuit. In a two-pixel mode, the first processor circuit is configured to process a first part of first input data and the second processor circuit is configured to process a second part of the first input data to generate output data for a display panel to display. In a picture-in-picture mode, the first processor circuit is configured to process second input data to generate main-picture output data and the second processor circuit is configured to process third input data to generate sub-picture output data for the display panel to display.

Some aspects of the present disclosure are to provide an image processing method. The image processing method includes following operations: in a two-pixel mode, processing, by a first processor circuit, a first part of first input data and processing, by a second processor circuit, a second part of first input data to generate output data for a display panel to display; and in a picture-in-picture mode, processing, by the first processor circuit, second input data to generate main-picture output data and processing, by the second processor circuit, third input data to generate sub-picture output data for the display panel to display.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
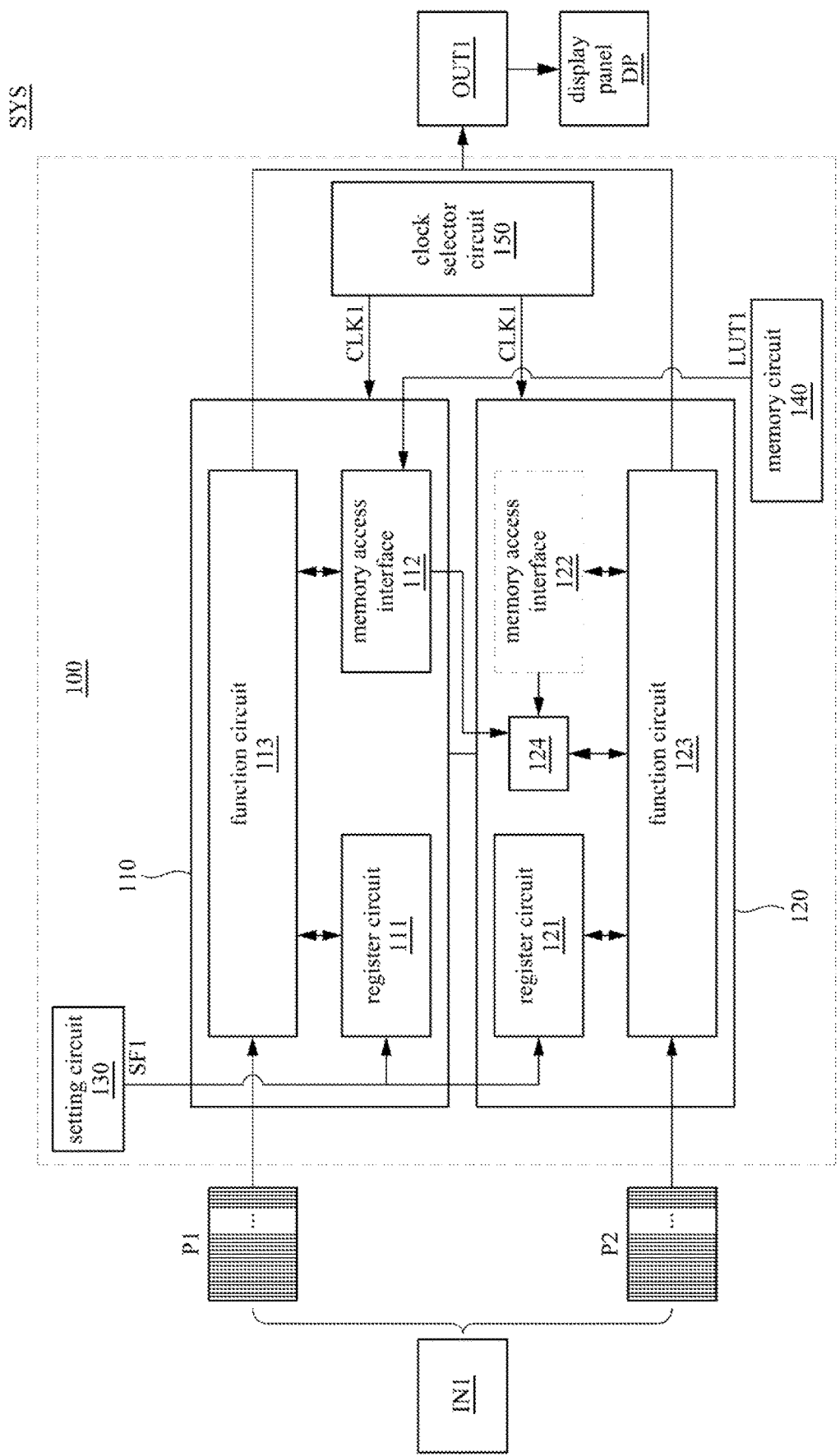
FIG. 1 is a schematic diagram of a display system in a two-pixel mode according to some embodiments of the present disclosure.

Reference is made to FIG. 1. FIG. 1 is a schematic diagram of a display system SYS in a two-pixel mode according to some embodiments of the present disclosure.

As illustrated in FIG. 1, the display system SYS includes an image processor circuit 100 and a display panel DP. The image processor circuit 100 is coupled to the display panel DP. The image processor circuit 100 can perform an image processing procedure on image input data to generate image output data for the display panel DP to display. For example, the display system SYS can operate in a two-pixel mode and a picture-in-picture mode.

In the two-pixel mode, the image processor circuit 100 can process two pixels (e.g., two neighbor pixels adjacent in a horizontal direction) in input data IN1 during one period to generate high pixel rate image output data OUT1. The high pixel rate image data can refer to high resolution image data or high frame rate image data. In other words, the image processor circuit 100 can process the data with higher pixel rate (higher resolution or higher frame rate).

As illustrated in FIG. 1, the image processor circuit 100 includes a processor circuit 110, a processor circuit 120, a setting circuit 130, a memory circuit 140, and a clock selector circuit 150. The processor circuit 110 and the processor circuit 120 are coupled to the setting circuit 130, the memory circuit 140, and the clock selector circuit 150.

To be more specific, the processor circuit 110 includes a register circuit 111, a memory access interface 112, and a function circuit 113. The function circuit 113 is coupled to the register circuit 111 and the memory access interface 112. The processor circuit 120 includes a register circuit 121, a memory access interface 122, and a function circuit 123. The function circuit 123 is coupled to the register circuit 121 and the memory access interface 122.

In some embodiments, the register circuit 111 or the register circuit 121 can include one or more registers. The registers can store data from the setting circuit 130. The data is, for example, a setting file SF1. The setting file SF1 can record image sizes or other setting values related to the image processing procedure. In some embodiments, the setting circuit 130 can be a Rbus wrapper circuit, but the present disclosure is not limited thereto.

In some embodiments, the memory access interface 112 or the memory access interface 122 can be, for example, a remote direct memory access (RDMA) interface. The memory access interface 112 or the memory access interface 122 can access data from the memory circuit 140. The data is, for example, a look-up table LUT1. The look-up table LUT1 can record color conversion relationships or other corresponding relationships related to the image processing procedure. In some embodiments, the memory circuit 140 can be a double data rate synchronous dynamic random access memory (DDR SRAM), but the present disclosure is not limited thereto.

In some embodiments, the function circuit 113 or the function circuit 123 can include one or more sub-function circuits. These sub-function circuits are configured to perform various image processing functions.

The input data IN1 can be from an image source. For example, the input data IN1 has 4K (3840×2160) resolution, 120 Hz frame rate, and 600M Hz clock rate, but the present disclosure is not limited thereto.

As illustrated in FIG. 1, the input data IN1 is divided into a first part P1 and a second part P2. In some embodiments, the first part P1 includes pixels in even columns and the second part P2 includes pixels in odd columns. The processor circuit 110 can perform the image processing procedure on the first part P1, and the processor circuit 120 can perform the image processing procedure on the second part P2. In other words, the two neighbor pixels adjacent in the horizontal direction are performed by the processor circuit 110 and the processor circuit 120 respectively.

Since the processor circuit 110 and the processor circuit 120 process the two pixels in the same input data IN1 respectively in the two-pixel mode, the clock selector circuit 150 can generate two same clock signals CLK1 (e.g., 600M Hz) and transmit the two same clock signals CLK1 to the processor circuit 110 and the processor circuit 120 respectively. Then, the processor circuit 110 and the processor circuit 120 perform the image processing procedures on the first part P1 and the second part P2 according to the same clock signals CLK1 respectively.

In addition, since the processor circuit 110 and the processor circuit 120 process the two pixels in the same input data IN1 respectively in the two-pixel mode, firmware can send out an instruction such that the setting circuit 130 transmits the setting file SF1 to the register circuit 111 at first, and hardware can utilize a broadcast method to duplicated whether-write-valid information (e.g., write_reg), write address information (e.g., write_add), and the setting file SF1 (e.g., write_data) in the register circuit 111 to the register circuit 121. In other words, in the two-pixel mode, the setting file SF1 in the register circuit 111 is the same to the setting file SF1 in the register circuit 121. In practical applications, the register circuit 111 or the register circuit 121 may include a plurality of registers, so utilizing the broadcast method to duplicate the setting file SF1 is more efficient and easy to design.

Regarding the writing function, it is assumed that the setting file SF1 to be written into the register circuit 111 is written to an address 0x181252xx and the setting file SF1 to be written into the register circuit 121 is written to an address 0x181352xx (the high bits are used to distinguish whether the data is written to the register circuit 111 or the register circuit 121, and the low bits are used to distinguish which register in the register circuit 111 or which register in the register circuit 121 the data is written into). As described above, the setting file SF1 to be written into the register circuit 111 can be set to be the same to the setting file SF1 to be written into the register circuit 121.

However, regarding the reading function, the system needs to distinguish whether to read files from the address 0x181252xx or to read files from the address 0x181352xx. In other words, the above broadcast method will not affect the reading function.

In addition, since the memory access interface 112 or the memory access interface 122 has less connection ports, the processor circuit 120 can further include a selector circuit 124 in some embodiments. The selector circuit 124 is coupled to the memory access interface 112 and the memory access interface 122. In the two-pixel mode, the memory circuit 140 can transmit the look-up table LUT1 to the memory access interface 112. Then, the selector circuit 124 can select and receive the look-up table LUT1 from the memory access interface 112 and transmit the look-up table LUT1 to the function circuit 123. At this time, the memory access interface 122 can be in an off state.

Thus, in the two-pixel mode, the processor circuit 110 can operate based on the clock signal CLK1, and the function circuit 113 can perform the image processing procedure on the first part P1 according to the setting file SF1 and the look-up table LUT1. At the same time, the processor circuit 120 can operate based on the clock signal CLK1, and the function circuit 123 can perform the image processing procedure on the second part P2 according to the setting file SF1 and the look-up table LUT1. The data generated by the image processing procedure of the processor circuit 110 and the data generated by the image processing procedure of the processor circuit 120 can be combined to be output data OUT1.

When the input data IN1 has 4K resolution, 120 Hz frame rate, and 600M Hz clock rate, the output data OUT1 also has 4K resolution, 120 Hz frame rate, and 600M Hz clock rate. In other words, the image processor circuit 100 can process the two pixels at the same time to process the high pixel rate image. The output data OUT1 can be transmitted to the display panel DP, and the display panel DP can display the high pixel rate image according to the output data OUT1.

Figure 2:
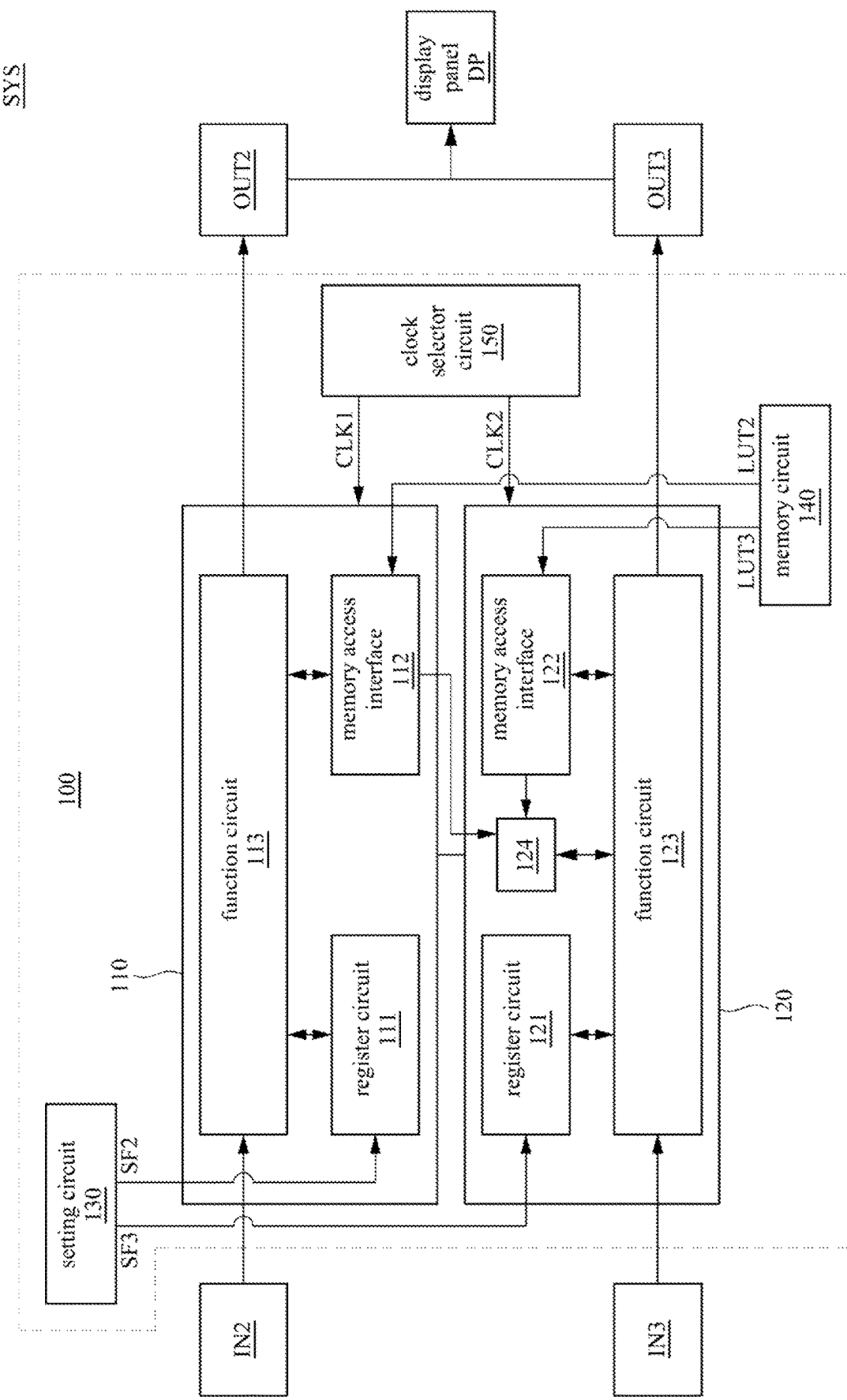
FIG. 2 is a schematic diagram of the display system in FIG. 1 in a picture-in-picture mode according to some embodiments of the present disclosure.

Reference is made to FIG. 2. FIG. 2 is a schematic diagram of the display system SYS in FIG. 1 in a picture-in-picture mode according to some embodiments of the present disclosure.

In the picture-in-picture mode, the image processor circuit 100 can process different input data IN2 and input data IN3 at the same time during one period to generate main-picture output data OUT2 and sub-picture output data OUT3. Accordingly, the display panel DP can display a main-picture image and a sub-picture image at the same time according to the main-picture output data OUT2 and the sub-picture output data OUT3.

The input data IN2 and the input data IN3 can be from different image sources. For example, the input data IN2 has 4K resolution, 60 Hz frame rate, and 600M Hz clock rate, and the input data IN3 has 2K resolution, 60 Hz frame rate, and 150M Hz clock rate, but the present disclosure is not limited thereto.

Since the processor circuit 110 and the processor circuit 120 in the picture-in-picture mode process the different input data IN2 and input data IN3 respectively, the clock selector circuit 150 can generate the different clock signals. The different clock signals are, for example, the clock signal CLK1 (e.g., 600M Hz) and a clock signal CLK2 (e.g., 150M Hz). Then, the clock selector circuit 150 transmits the clock signal CLK1 to the processor circuit 110 and transmit the clock signal CLK2 to processor circuit 120. Then, the processor circuit 110 performs the image processing procedure on the input data IN2 according to the clock signal CLK1, and the processor circuit 120 performs the image processing procedure on the input data IN3 according to the clock signal CLK2.

Since the processor circuit 110 and the processor circuit 120 in the picture-in-picture mode process the different input data IN2 and input data IN3 respectively, the setting circuit 130 can transmit a setting file SF2 to the register circuit 111 and transmit a setting file SF3 to the register circuit 121. In other words, in the picture-in-picture mode, the setting file SF2 in the register circuit 111 may be different from the setting file SF3 in the register circuit 121.

In addition, the memory circuit 140 can transmit a look-up table LUT2 to the memory access interface 112 and transmit a look-up table LUT3 to the memory access interface 122. In other words, in the picture-in-picture mode, the look-up table LUT2 accessed by the memory access interface 112 may be different from the look-up table LUT3 accessed by the memory access interface 122.

Thus, in the picture-in-picture mode, the processor circuit 110 can operate based on the clock signal CLK1, and the function circuit 113 can perform the image processing procedure on the input data IN2 according to the setting file SF2 and the look-up table LUT2 to generate the main-picture output data OUT2. At the same time, the processor circuit 120 can operate based on the clock signal CLK2, and the function circuit 123 can perform the image processing procedure on the input data IN3 according to the setting file SF3 and the look-up table LUT3 to generate the sub-picture output data OUT3. When the input data IN2 has 4K resolution, 60 Hz frame rate, and 600M Hz clock rate, the main-picture output data OUT2 also has 4K resolution, 60 Hz frame rate, and 600M Hz clock rate. When the input data IN3 has 2K resolution, 60 Hz frame rate, and 150M Hz clock rate, the sub-picture output data OUT3 also has 2K resolution, 60 Hz frame rate, and 150M Hz clock rate. The main-picture output data OUT2 and the sub-picture output data OUT3 can be transmitted to the display panel DP, and the display panel DP can display the main-picture image according to the main-picture output data OUT2 and display the sub-picture image according to the sub-picture output data OUT3. In other words, the display panel DP can display two independent images (the main-picture image and the sub-picture image) at the same time.

Figure 3:
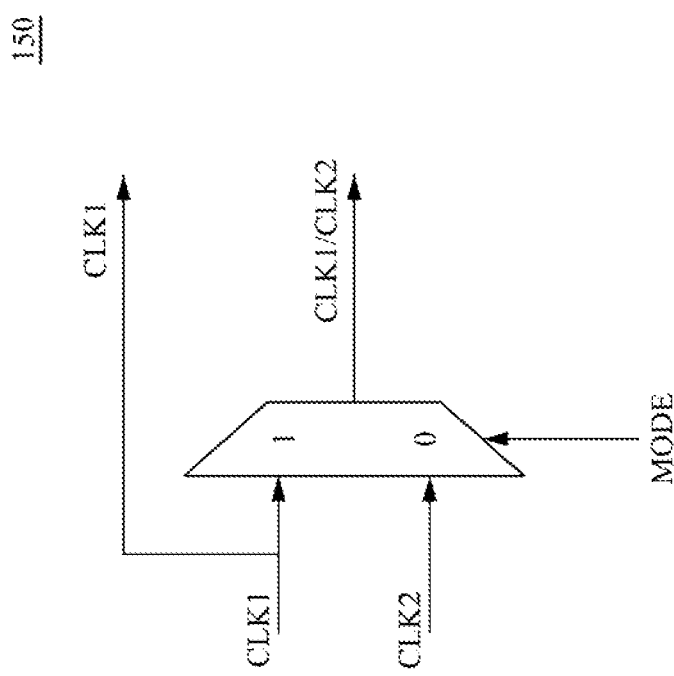
FIG. 3 is a schematic diagram of a clock selector circuit according to some embodiments of the present disclosure.

Reference is made to FIG. 3. FIG. 3 is a schematic diagram of the clock selector circuit 150 in FIG. 1 according to some embodiments of the present disclosure.

As illustrated in FIG. 3, the clock selector circuit 150 is implemented by a multiplexer, but the present disclosure is not limited thereto. The clock selector circuit 150 includes a first input terminal (corresponding to a value 1), a second input terminal (corresponding to a value 0), a control terminal, and an output terminal. The first input terminal is configured to receive the clock signal CLK1 and transmit the clock signal CLK1 to the processor circuit 110 in FIG. 1 or FIG. 2. The second input terminal is configured to receive the clock signal CLK2. The control terminal is configured to receive a mode signal MODE. The output terminal is coupled to the processor circuit 120 in FIG. 1 or FIG. 2.

In the two-pixel mode (FIG. 1), the mode signal MODE can correspond to the value 1. Accordingly, in addition to transmitting the clock signal CLK1 directly to the processor circuit 110 in FIG. 1, the clock selector circuit 150 selects the clock signal CLK1 and outputs the clock signal CLK1 to the processor circuit 120 in FIG. 1 such that the processor circuit 110 and the processor circuit 120 in FIG. 1 operate based on the same clock signal.

In the picture-in-picture mode (FIG. 2), the mode signal MODE can correspond to the value 0. Accordingly, in addition to transmitting the clock signal CLK1 directly to the processor circuit 110 in FIG. 2, the clock selector circuit 150 selects the clock signal CLK2 and outputs the clock signal CLK2 to the processor circuit 120 in FIG. 2 such that the processor circuit 110 and the processor circuit 120 in FIG. 2 operate based on the different clock signals.

In some related approaches, if a display system supports the two-pixel mode, it needs to dispose two set of image processor circuits in the display system to process two pixels at the same time. This will increase the circuit area, and one of the two set of image processor circuits will be idle when the display system does not need to support the two-pixel mode.

Compared to the above related approaches, in the present disclosure, it merely needs to dispose one image processor circuit 100 to process two pixels at the same time in the two-pixel mode and to process the main-picture data and the sub-picture data at the same time in the picture-in-picture mode. Accordingly, this does not increase excessively (or increase slightly) the circuit area and does not make the circuit to be idle.

Figure 4:
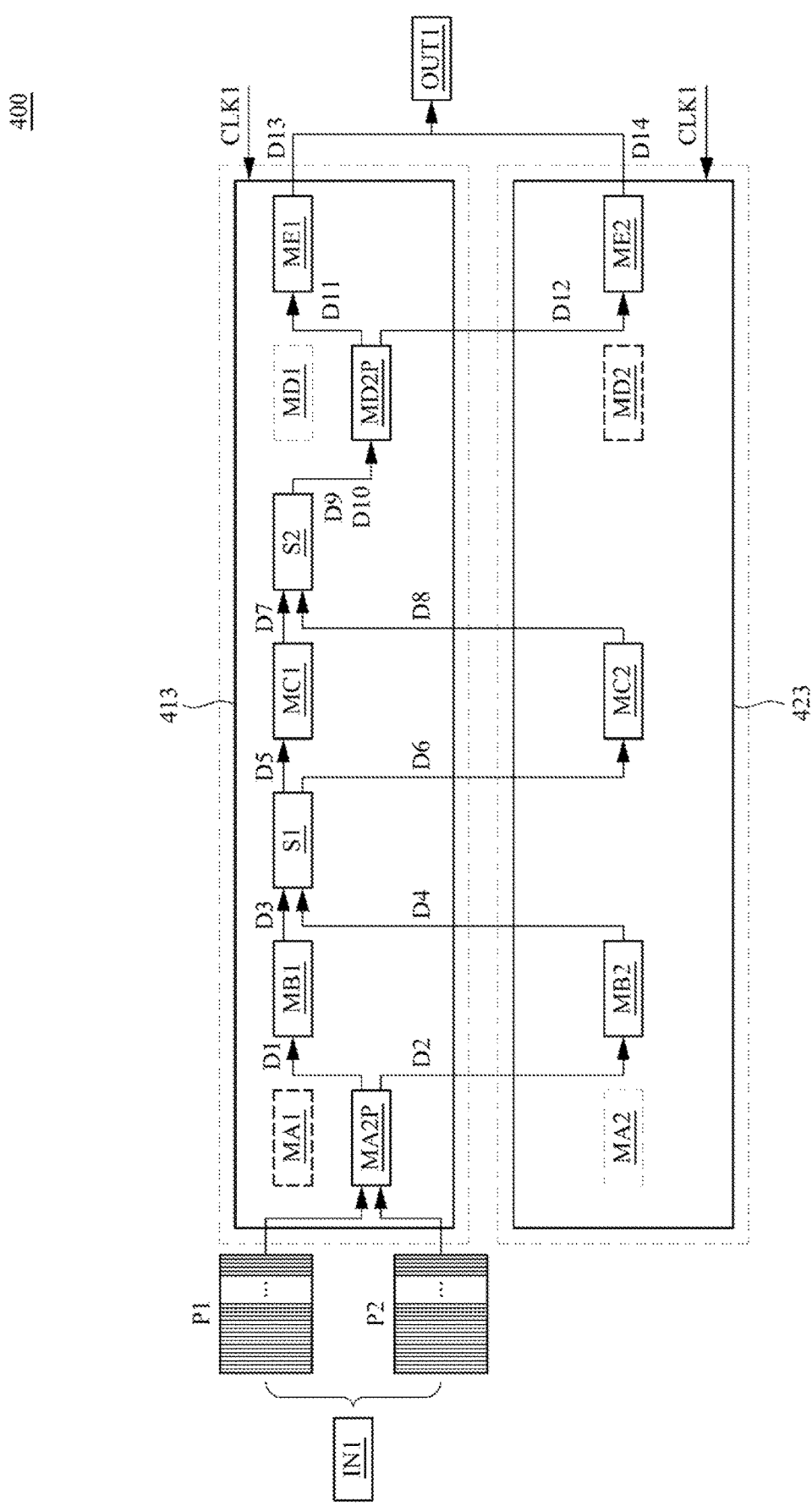
FIG. 4 is a schematic diagram of an image processor circuit in a two-pixel mode according to some embodiments of the present disclosure.

Reference is made to FIG. 4. FIG. 4 is a schematic diagram of an image processor circuit 400 in a two-pixel mode according to some embodiments of the present disclosure.

When the display system has a horizontal filter or has a requirement of considering neighbor data adjacent in a horizontal direction, the image processor circuit 100 in FIG. 1 can be replaced by the image processor circuit 400 (in FIG. 1, the neighbor pixels adjacent in the horizontal direction are processed by the different processor circuit 110 and processor circuit 120 respectively).

For simplicity of the drawing, FIG. 4 merely illustrates a function circuit 413 and a function circuit 423 in the image processor circuit 400. The function circuit 413 and the function circuit 423 can be used to implement functions similar to the function circuit 113 and the function circuit 123 in FIG. 1. Other circuits or other elements in the display system SYS are omitted in FIG. 4.

As illustrated in FIG. 4, the function circuit 413 includes a sub-function circuit MA1, a sub-function circuit MB1, a sub-function circuit MC1, a sub-function circuit MD1, and a sub-function circuit ME1.

The function circuit 423 includes a sub-function circuit MA2, a sub-function circuit MB2, a sub-function circuit MC2, a sub-function circuit MD2, and a sub-function circuit ME2.

Regarding the image processing function of each of the sub-function circuits, the sub-function circuit MA1 and the sub-function circuit MA2 can perform the same image processing function. The sub-function circuit MB1 and the sub-function circuit MB2 can perform the same image processing function. The sub-function circuit MC1 and the sub-function circuit MC2 can perform the same image processing function. The sub-function circuit MD1 and the sub-function circuit MD2 can perform the same image processing function. The sub-function circuit ME1 and the sub-function circuit ME2 can perform the same image processing function.

The function circuit 413 further includes a sub-function circuit MA2P, a swapping circuit S1, a swapping circuit S2, and a sub-function circuit MD2P. The sub-function circuit MA2P, the sub-function circuit MA1, and the sub-function circuit MA2 can perform the same image processing function. The sub-function circuit MD2P, the sub-function circuit MD1, and the sub-function circuit MD2 can perform the same image processing function.

Taking the color code YUV422 as an example, chrominance values (U) and chroma values (V) are arranged alternately such as, U0, V0, U2, V2, U4, V4, U6, V6. When they are applied to FIG. 1, the function circuit 113 processes U0, U2, U4, U6 (chrominance values), and the function circuit 123 processes V0, V2, V4, V6 (chroma values). In other words, the neighbor data adjacent in the horizontal direction are processed by the processor circuit 110 and the processor circuit 120 respectively. Accordingly, when there is a requirement of a horizontal filter or there is a requirement of consideration of the neighbor pixels adjacent in the horizontal direction in the display system, the image processor circuit 100 cannot satisfy these requirements.

Compared to the image processor circuit 100, the image processor circuit 400 can satisfy the above requirements. As illustrated in FIG. 4, the sub-function circuit MA2P can receive the first part P1 and the second part P2 of the same input data IN1 and perform the image processing procedure on the first part P1 and the second part P2 to generate data D1 and data D2. Then, the sub-function circuit MB1 can perform the image processing procedure on the data D1 to generate data D3, and the sub-function circuit MB2 can perform the image processing procedure on the data D2 to generate data D4. Then, the swapping circuit S1 can receive the data D3 and the data D4 and swap part content of the data D3 with part content of the data D4 to generate data D5 (swapped data) and data D6 (swapped data). Taking the above examples as an example, the data D3 corresponds to U0, U2, U4, U6, and the data D4 corresponds to V0, V2, V4, V6. After the swapping of the swapping circuit S1, the data D5 corresponds to U0, V0, U4, V4, and the data D6 corresponds to U2, V2, U6, V6. Then, the sub-function circuit MC1 can perform the image processing procedure on the data D5 to generate data D7, and the sub-function circuit MC2 can perform the image processing procedure on the data D6 to generate data D8.

Then, the swapping circuit S2 can receive the data D7 and the data D8 and swap part content of the data D7 with part content of the data D8 to generate data D9 (restored data) and data D10 (restored data). Taking the above examples as an example, the data D7 corresponds to U0, V0, U4, V4, and the data D8 corresponds to U2, V2, U6, V6. After the swapping of the swapping circuit S2, the data D9 corresponds to U0, U2, U4, U6, and the data D10 corresponds to V0, V2, V4, V6. Then, the sub-function circuit MD2P can receive the data D9 and the data D10, and perform the image processing procedure on the data D9 and the data D10 to generate data D11 and data D12. Then, the sub-function circuit ME1 can perform the image processing procedure on the data D11 to generate data D13, and the sub-function circuit ME2 can perform the image processing procedure on the data D12 to generate data D14. The data D13 and the data D14 can be combined to be the output data OUT1.

Since the data processed by the sub-function circuit MA2P, the sub-function circuit MC1, the sub-function circuit MC2, and the sub-function circuit MD2P include the neighbor pixels adjacent in the horizontal direction, the image processor circuit 400 can satisfy the requirement of the horizontal filter or the requirement of consideration of the neighbor pixels adjacent in the horizontal direction.

Figure 5:
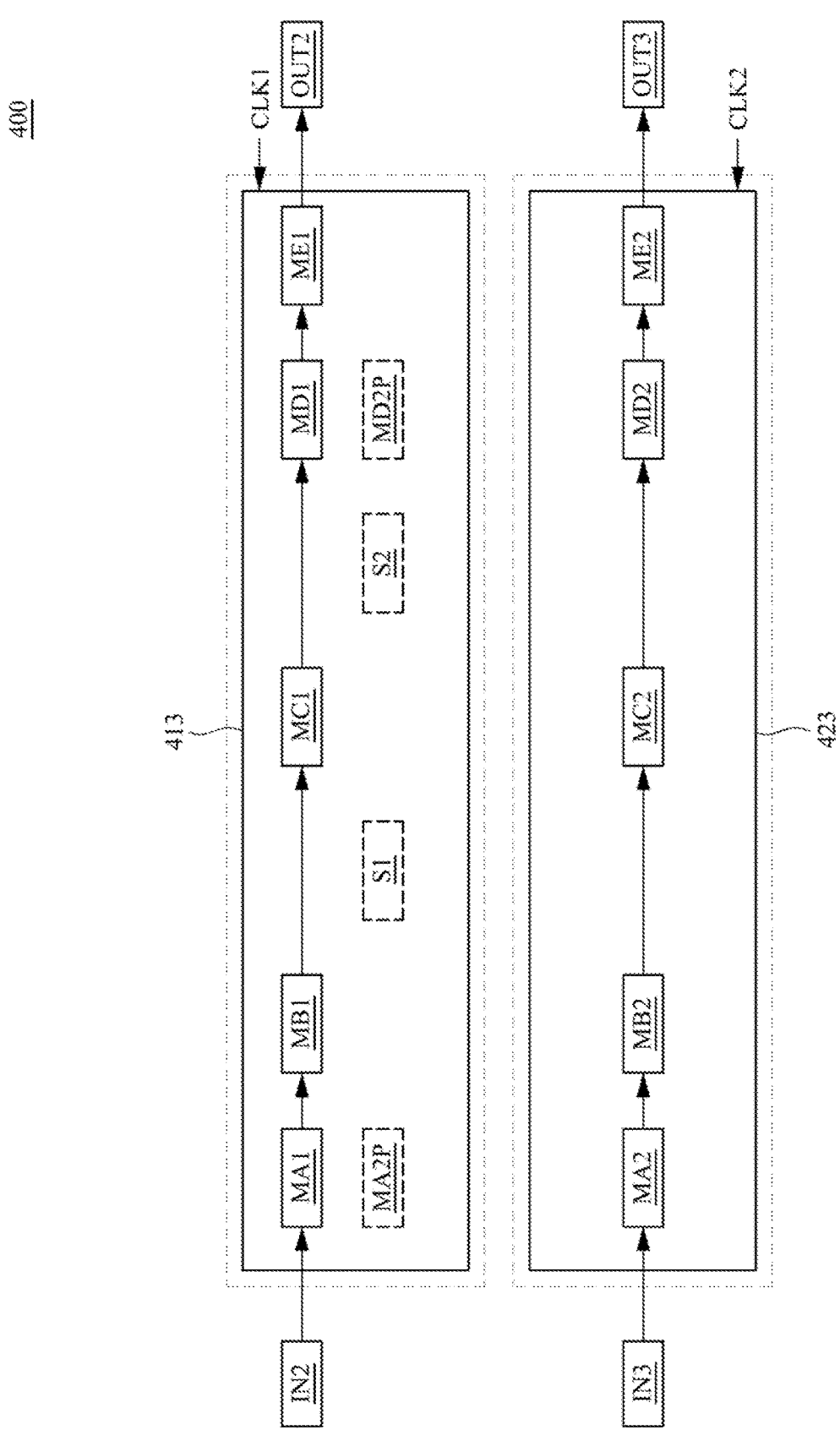
FIG. 5 is a schematic diagram of the image processor circuit in FIG. 4 in a picture-in-picture mode according to some embodiments of the present disclosure.

Reference is made to FIG. 5. FIG. 5 is a schematic diagram of the image processor circuit 400 in FIG. 4 in a picture-in-picture mode according to some embodiments of the present disclosure.

As illustrated in FIG. 5, in the picture-in-picture mode, the sub-function circuit MA2P, the swapping circuit S1, the swapping circuit S2, and the sub-function circuit MD2P are disabled (shown by dotted lines in FIG. 5). In other words, the input data IN2 is transmitted to the sub-function circuit MA1. The sub-function circuit MA1, the sub-function circuit MB1, the sub-function circuit MC1, the sub-function circuit MD1, and the sub-function circuit ME1 (a first channel) perform corresponding image processing functions sequentially to generate the main-picture output data OUT2 according to the input data IN2. At the same time, the input data IN3 is transmitted to the sub-function circuit MA2. The sub-function circuit MA2, the sub-function circuit MB2, the sub-function circuit MC2, the sub-function circuit MD2, and the sub-function circuit ME2 (a second channel) perform corresponding image processing functions sequentially to generate the sub-picture output data OUT3 according to the input data IN3. Then, the main-picture output data OUT2 and the sub-picture output data OUT3 can be transmitted to the display panel DP, and the display panel DP can display the main-picture image according to the main-picture output data OUT2 and display the sub-picture image according to the sub-picture output data OUT3. In other words, the display panel DP can display two independent images (the main-picture image and the sub-picture image) at the same time.

Figure 6:
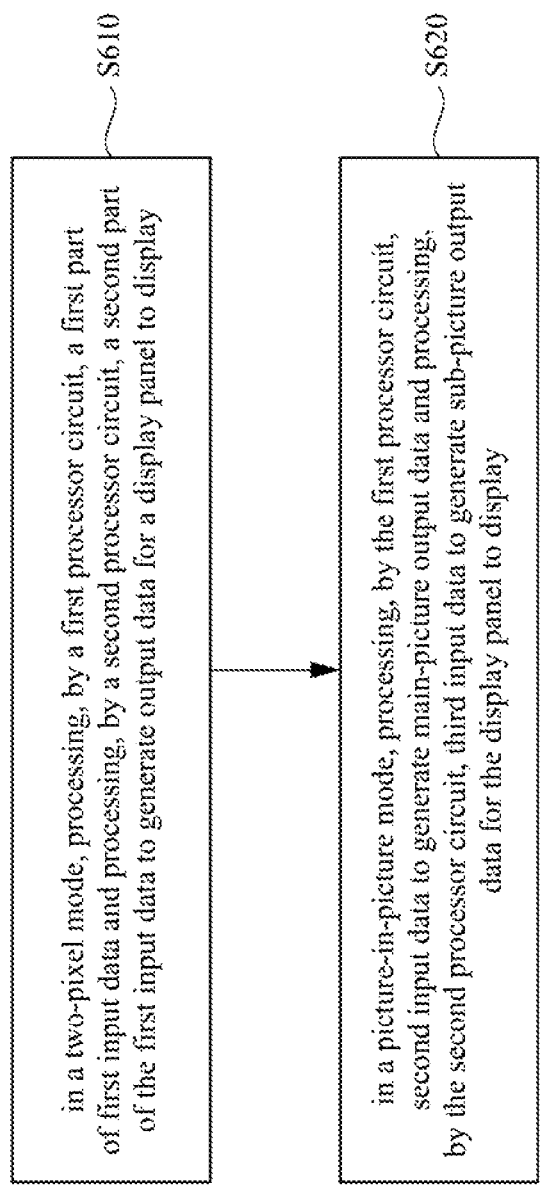
FIG. 6 is a flow diagram of an image processing method according to some embodiments of the present disclosure.

Reference is made to FIG. 6. FIG. 6 is a flow diagram of an image processing method 600 according to some embodiments of the present disclosure. As illustrated in FIG. 6, the image processing method 600 includes operation S610 and operation S620.

In some embodiments, the image processing method 600 can be applied to the image processor circuit 100 in FIG. 1 and FIG. 2 or applied to the image processor circuit 400 in FIG. 4 and FIG. 5, but the present disclosure is not limited thereto. For better understanding, the image processing method 600 is described in following paragraphs with reference to the image processor circuit 100 in FIG. 1 and FIG. 2.

In operation S610, in the two-pixel mode, the processor circuit 110 processes the first part P1 of the input data IN1 and the processor circuit 120 processes the second part P2 of the input data IN1 to generate the output data OUT1 for the display panel DP to display.

In operation S620, in the picture-in-picture mode, the processor circuit 110 processes the input data IN2 to generate the main-picture output data OUT2, and the processor circuit 120 processes the input data IN3 to generate the sub-picture output data OUT3 for the display panel DP to display.

Since the details of operation S610 and operation S620 are described in above paragraphs related to FIG. 1 and FIG. 2, they are not described herein again.

As described above, in the present disclosure, the image processor circuit can support both of the two-pixel mode and the picture-in-picture mode.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. An image processor circuit, comprising:
a first processor circuit; and
a second processor circuit,
wherein in a two-pixel mode, the first processor circuit is configured to process a first part of first input data and the second processor circuit is configured to process a second part of the first input data to generate output data for a display panel to display, wherein in a picture-in-picture mode, the first processor circuit is configured to process second input data to generate main-picture output data and the second processor circuit is configured to process third input data to generate sub-picture output data for the display panel to display.

2. The image processor circuit of claim 1, wherein the first processor circuit receives a first clock signal, wherein the image processor circuit further comprises:
a clock selector circuit configured to receive the first clock signal and a second clock signal and controlled by a mode signal,
wherein when the mode signal corresponds to the two-pixel mode, the clock selector circuit outputs the first clock signal to the second processor circuit,
wherein when the mode signal corresponds to the picture-in-picture mode, the clock selector circuit outputs the second clock signal to the second processor circuit.

3. The image processor circuit of claim 2, wherein the second clock signal is different from the first clock signal.

4. The image processor circuit of claim 1, wherein the first processor circuit comprises:
a first register circuit configured to store a first setting file;
a first memory access interface configured to access a first look-up table; and
a first function circuit coupled to the first register circuit and the first memory access interface.

5. The image processor circuit of claim 4, wherein the second processor circuit comprises:
a second register circuit configured to store a second setting file;
a second memory access interface configured to access a second look-up table; and
a second function circuit coupled to the second register circuit and the second memory access interface.

6. The image processor circuit of claim 5, further comprising:
a setting circuit, wherein in the picture-in-picture mode, the setting circuit is configured to transmit the first setting file to the first register circuit and transmit the second setting file to the second register circuit; and
a memory circuit, wherein in the picture-in-picture mode, the memory circuit is configured to transmit the first look-up table to the first memory access interface and transmit the second look-up table to the second memory access interface.

7. The image processor circuit of claim 6, wherein in the two-pixel mode, the setting circuit is configured to transmit the first setting file to the first register circuit and utilize a broadcast method to duplicate the first setting file to the second register circuit as the second setting file.

8. The image processor circuit of claim 7, wherein in the two-pixel mode, the memory circuit is configured to transmit the first look-up table to the first memory access interface, wherein the second processor circuit further comprises:
a selector circuit, wherein in the two-pixel mode, the selector circuit is configured to receive the first look-up table from the first memory access interface and transmit the first look-up table to the second function circuit.

9. The image processor circuit of claim 5, wherein the first function circuit comprises:
a first sub-function circuit, wherein in the two-pixel mode, the first sub-function circuit is configured to process the first part and the second part;
a first swapping circuit configured to swap part content of first data corresponding to the first part with part content of second data corresponding to the second part to generate first swapped data and second swapped data;
a second swapping circuit configured to swap part content of third data corresponding to the first swapped data with part content of fourth data corresponding to the second swapped data to generate first restored data and second restored data; and
a second sub-function circuit configured to process the first restored data and the second restored data,
wherein the first processor circuit and the second processor circuit are further configured to generate the output data according to the first restored data and the second restored data.

10. The image processor circuit of claim 9, wherein in the picture-in-picture mode, the first sub-function circuit, the first swapping circuit, the second swapping circuit, and the second sub-function circuit are disabled.

11. An image processing method, comprising:
in a two-pixel mode, processing, by a first processor circuit, a first part of first input data and processing, by a second processor circuit, a second part of the first input data to generate output data for a display panel to display; and
in a picture-in-picture mode, processing, by the first processor circuit, second input data to generate main-picture output data and processing, by the second processor circuit, third input data to generate sub-picture output data for the display panel to display.

12. The image processing method of claim 11, further comprising:
receiving, by the first processor circuit, a first clock signal;
receiving, by a clock selector circuit, the first clock signal and a second clock signal, wherein the clock selector circuit is controlled by a mode signal;
when the mode signal corresponds to the two-pixel mode, outputting, by the clock selector circuit, the first clock signal to the second processor circuit; and
when the mode signal corresponds to the picture-in-picture mode, outputting, by the clock selector circuit, the second clock signal to the second processor circuit.

13. The image processing method of claim 12, wherein the second clock signal is different from the first clock signal.

14. The image processing method of claim 11, further comprising:
storing, by a first register circuit, a first setting file; and
accessing, by a first memory access interface, a first look-up table,
wherein a first function circuit is coupled to the first register circuit and the first memory access interface.

15. The image processing method of claim 14, further comprising:
storing, by a second register circuit, a second setting file; and
accessing, by a second memory access interface, a second look-up table,
wherein a second function circuit is coupled to the second register circuit and the second memory access interface.

16. The image processing method of claim 15, further comprising:
in the picture-in-picture mode, transmitting, by a setting circuit, the first setting file to the first register circuit and transmitting, by the setting circuit, the second setting file to the second register circuit; and in the picture-in-picture mode, transmitting, by a memory circuit, the first look-up table to the first memory access interface and transmitting, by the memory circuit, the second look-up table to the second memory access interface.

17. The image processing method of claim 16, further comprising:
in the two-pixel mode, transmitting, by the setting circuit, the first setting file to the first register circuit; and
utilizing a broadcast method to duplicate the first setting file to the second register circuit as the second setting file.

18. The image processing method of claim 17, further comprising:
in the two-pixel mode, transmitting, by the memory circuit, the first look-up table to the first memory access interface; and
receiving, by a selector circuit, the first look-up table from the first memory access interface and transmitting, by the selector circuit, the first look-up table to the second function circuit.

19. The image processing method of claim 15, further comprising:
in the two-pixel mode, processing, by a first sub-function circuit, the first part and the second part;
swapping, by a first swapping circuit, part content of first data corresponding to the first part with part content of second data corresponding to the second part to generate first swapped data and second swapped data;
swapping, by a second swapping circuit, part content of third data corresponding to the first swapped data with part content of fourth data corresponding to the second swapped data to generate first restored data and second restored data;
processing, by a second sub-function circuit, the first restored data and the second restored data; and
generating, by the first processor circuit and the second processor circuit, the output data according to the first restored data and the second restored data.

20. The image processing method of claim 19, further comprising:
in the picture-in-picture mode, disabling the first sub-function circuit, the first swapping circuit, the second swapping circuit, and the second sub-function circuit.

* * * * *